United States Patent
Ilieva et al.

(10) Patent No.: US 11,218,836 B1
(45) Date of Patent: Jan. 4, 2022

(54) SYSTEMS AND METHODS FOR CONTROLLING A GEO-FENCE

(71) Applicant: Ford Global Technologies, LLC, Dearborn, MI (US)

(72) Inventors: Elena Ilieva, Bloomfield Hills, MI (US); Hussam Makkiya, Dearborn, MI (US); Ricardo Walker, Southfield, MI (US); Yamen Taleb, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/082,163

(22) Filed: Oct. 28, 2020

(51) Int. Cl.
| | |
|---|---|
| *H04W 4/12* | (2009.01) |
| *H04W 4/021* | (2018.01) |
| *H04W 4/02* | (2018.01) |
| *H04W 76/11* | (2018.01) |
| *H04W 4/40* | (2018.01) |
| *H04W 4/029* | (2018.01) |

(52) U.S. Cl.
CPC .......... *H04W 4/022* (2013.01); *H04W 4/023* (2013.01); *H04W 4/029* (2018.02); *H04W 4/12* (2013.01); *H04W 4/40* (2018.02); *H04W 76/11* (2018.02)

(58) Field of Classification Search
CPC ....... H04W 4/12; H04W 4/022; H04W 4/023; H04W 4/029; H04W 4/40; H04W 76/11

USPC ........................................................ 455/456.3
See application file for complete search history.

(56) References Cited

U.S. PATENT DOCUMENTS

| | | | |
|---|---|---|---|
| 9,998,864 B2 | 6/2018 | Kumar et al. | |
| 2013/0226449 A1* | 8/2013 | Rovik | G01C 21/362 |
| | | | 701/424 |
| 2013/0332007 A1* | 12/2013 | Louboutin | H04W 4/02 |
| | | | 701/2 |
| 2015/0258961 A1 | 9/2015 | Doherty et al. | |
| 2016/0027307 A1* | 1/2016 | Abhyanker | G06Q 50/01 |
| | | | 701/117 |
| 2019/0342739 A1* | 11/2019 | Shah | G01C 21/3492 |
| 2021/0049725 A1* | 2/2021 | Heath | H04W 4/40 |
| 2021/0075594 A1* | 3/2021 | Hassani | H04W 8/005 |

OTHER PUBLICATIONS

Suganthi et al., "Vehicle Tracking with Geo Fencing on Android Platform," International Journal of Engineering Science and Computing, vol. 8, Issue No. 4, Apr. 2017, 4 pages.

* cited by examiner

*Primary Examiner* — Congvan Tran
(74) *Attorney, Agent, or Firm* — Brandon Hicks; Eversheds Sutherland (US) LLP

(57) ABSTRACT

The disclosure describes systems and methods for controlling a geo-fence. Through the use of the geo-fence and through monitoring of connections between mobile devices and the vehicle, a geo-fence is dynamically enabled and disabled for a user of a vehicle and the geo-fence control system provides notifications to users of the vehicle.

20 Claims, 6 Drawing Sheets

SYSTEMS AND METHODS FOR CONTROLLING A GEO-FENCE

BACKGROUND

In the sharing economy or even within a group, such as a family, a number of users may share the use of a vehicle. To make such sharing possible, it is important to know when the vehicle is available. In addition, it is important to track the unauthorized use of the vehicle. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure provides systems and methods for controlling a geo-fence. In particular, a geo-fence is dynamically enabled and disabled for a user of a vehicle. Dynamically enabling and disabling the geo-fence provides that the user does not have to manually turn on and off the geo-fence, which a user may forget to do.

Through the use of the geo-fence and through monitoring of connections between mobile devices and the vehicle, a last user of the vehicle can get notifications when another authorized user uses the vehicle and when the vehicle leaves an area of a geo-fence. The last user can also receive notifications when an unconfirmed or unauthorized user has possession of the vehicle and when the vehicle leaves the area of the geo-fence. These notifications allow for more efficient sharing of the vehicle and for tracking the vehicle during unauthorized use.

According to one method, a vehicle stores a first mobile device identifier that is based on a connection between a first mobile device and the vehicle and is marked as a last device connected to the vehicle. The geo-fence control system determines a vehicle location and accesses a geo-fence account associated with the first mobile device identifier. Based on a setting in the geo-fence account, the geo-fence control system activates a geo-fence around the vehicle location.

Upon connection of a mobile device to the vehicle, the vehicle determines a second mobile device identifier. The geo-fence control systems compares the first mobile device identifier to the second mobile device identifier. If the first mobile device identifier is the same as the second mobile device identifier, the geo-fence control systems disables the geo-fence.

These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown, and not intended to be limiting.

Figure 1:
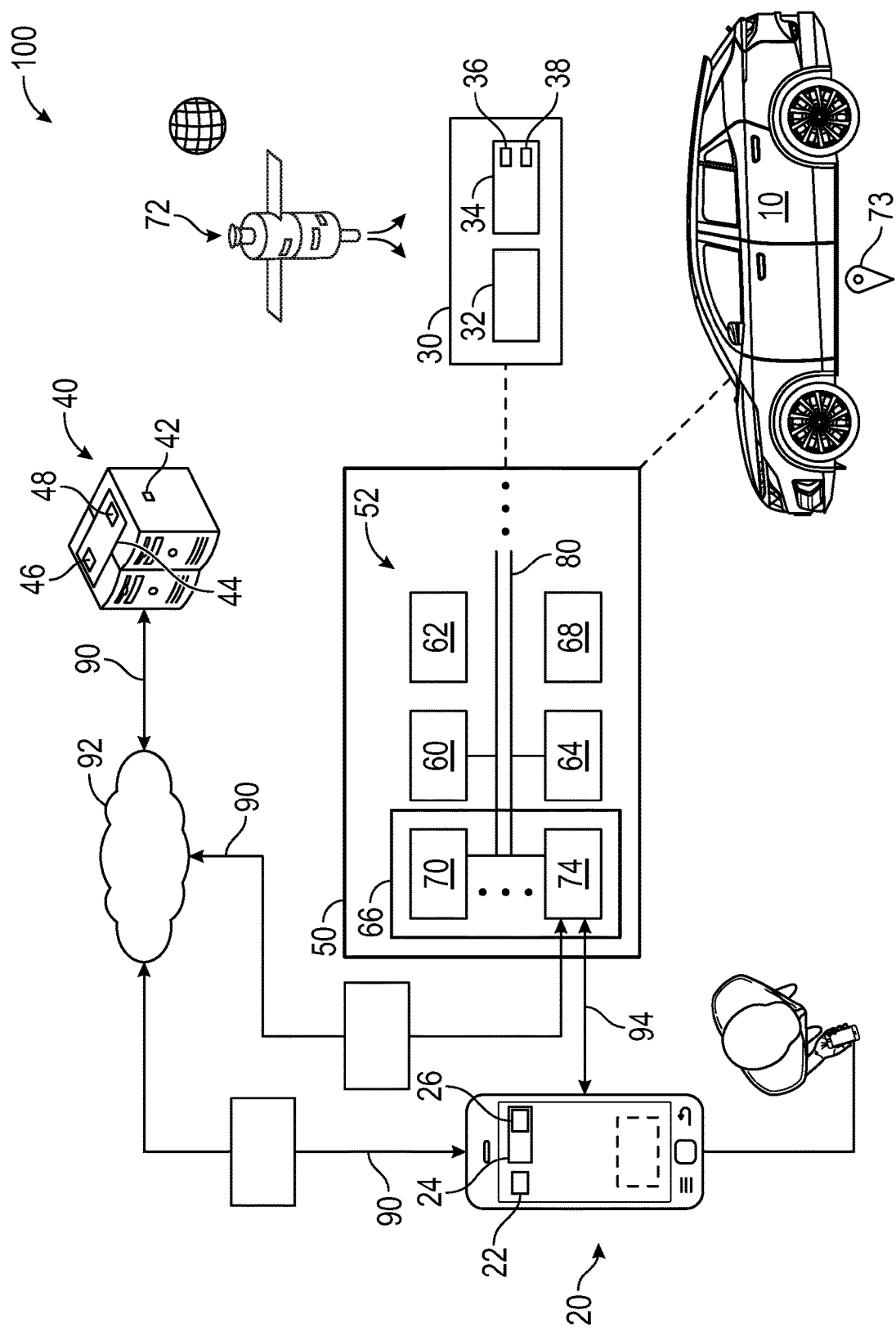
FIG. 1 illustrates an example functional schematic of a geo-fence control system including a vehicle, a mobile device, and a server in accordance with the present disclosure.

FIG. 1 illustrates a vehicle 10, a mobile device 20, and a server 40 in communication with one another. Although illustrated as a car, the vehicle may take the form of another passenger or commercial automobile such as, for example, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 10 may be configured as an electric vehicle (EV). More particularly, the vehicle 10 may include a battery EV (BEV) drive system. The vehicle 10 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 10 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

The mobile device 20 includes a processor 22 and a memory 24. The memory 24 stores a mobile device application 26 including program instructions that, when executed by the processor 22, performs aspects of the disclosed methods described below including setting up a geo-fence account, receiving notifications, and sending confirmations. As such, the mobile device 20 and mobile device application 26 may be part a of a geo-fence control system 100 described in further detail below including transmitting information for such systems.

The server 40 (e.g., one or more servers) may be part of a cloud-based computing infrastructure, and may be associated with and/or include a Telematics Service Delivery Network (SDN) that provides digital data services to the vehicle 10. The server 40 includes a processor 42 and a memory 44. The memory 44 includes a server application 46 including program instructions that, when executed by the processor 42, preforms aspects of the disclosed methods including controlling a geo-fence and sending and receiving notifications and information. For example, the server application 46 generates and accesses a geo-fence account list 48 and sends notifications to mobile devices 20 on the geo-fence account list 48. As such, the server 40 and server application 46 may be part of the geo-fence control system 100 described in further detail below or may transmit information for such systems.

The vehicle 10 includes an automotive computer 30. The automotive computer 30 includes a processor 32 and a memory 34. The memory 34 includes a vehicle application 36 including program instructions that, when executed by the processor 32, preforms aspects of the disclosed methods including gathering, sending, and receiving information. For example, the vehicle application 36 generates and accesses a list of devices 38; gathers information from vehicle systems including a vehicle location 73, "on" and "off" states 314, 316 of the vehicle 10, and instances of pairing 222 the vehicle 10 to a mobile device 20; and sends information to the server 40 as described in further detail below. As such, the automotive computer 30 and vehicle application 36 may be part a of the geo-fence control system 100 described in further detail below or may transmit information for such systems.

The memory 24, 34, 44 may be a non-transitory computer-readable memory storing program code. The memory can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The vehicle 10 further includes a Vehicle Controls Unit (VCU) 50. The VCU 50 includes a plurality of electronic control units (ECUs) 52 disposed in communication with the automotive computer 30. The automotive computer 30 may be or include an electronic vehicle controller. The automotive computer 30 and the VCU 50 may be installed in an engine compartment of the vehicle 10 (as schematically illustrated) or elsewhere in the vehicle 10.

The ECUs 52 may control aspects of vehicle operation and communication using inputs from human drivers, inputs from a vehicle system controllers, and/or via wireless signal inputs received via wireless channel(s) from other connected devices such as a mobile device, among others. The ECUs 52 (e.g., when configured as nodes in a CAN bus 80 described in further detail below) may each include a central processing unit (CPU), a CAN controller, and/or a transceiver (not shown in FIG. 1).

The VCU 50 may coordinate the sharing of data between vehicle systems, connected servers (e.g., server 40) and devices (e.g., mobile device 20). The VCU 50 can include or communicate with any combination of the ECUs 52, such as, for example, a Body Control Module (BCM) 60, an Engine Control Module (ECM) 62, a Transmission Control Module (TCM) 64, a Telematics Control Unit (TCU) 66, a Restraint Control Module (RCM) 68, and the like. The ECUs 52 described with respect to the VCU 50 are provided for exemplary purposes only, and are not intended to be limiting or exclusive. Control and/or communication with other control modules not shown in FIG. 1 is possible, and such control is contemplated.

The ECUs 52 can communicate with one another and the automotive computer 30 by way of a Controller Area Network (CAN) bus 80. Accordingly, the automotive computer 30 may retrieve information from, send information to, and otherwise interact with the ECUs 52 to perform steps described according to embodiments of the present disclosure.

The CAN bus 80 may be configured as a multi-master serial bus standard for connecting two or more of the ECUs 52 as nodes using a message-based protocol that can be configured and/or programmed to allow the ECUs 52 to communicate with each other. The CAN bus 80 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration.

The CAN bus 80 may connect CAN bus nodes (e.g., the ECUs 52) to each other through a two-wire bus, which may be a twisted pair having a nominal characteristic impedance. The CAN bus 80 may also be accomplished using other communication protocol solutions, such as Media Oriented Systems Transport (MOST) or Ethernet. In other aspects, the CAN bus 80 may be a wireless intra-vehicle CAN bus.

ECUs 52 are now described in further detail.

The BCM 60 generally includes an integration of sensors, vehicle performance indicators, and variable reactors associated with vehicle systems. The BCM 60 may include processor-based power distribution circuitry that can control functions associated with the vehicle body such as lights, windows, security, door locks and access control, and various comfort controls. The BCM 60 may also operate as a gateway for bus and network interfaces to interact with remote ECUs (not shown in FIG. 1).

The BCM 60 may coordinate any one or more functions from a wide range of vehicle functionality, including energy management systems, alarms, vehicle immobilizers, ignition systems, driver and rider access authorization systems, Phone-as-a-Key (PaaK) systems, driver assistance systems, Autonomous Vehicle (AV) control systems, power windows, doors, actuators, and other functionality, etc. The BCM 60 may be configured for vehicle energy management, exterior lighting control, wiper functionality, power window and door functionality, heating ventilation and air conditioning systems, and driver integration systems. In other aspects, the BCM 60 may control auxiliary equipment functionality, and/or is responsible for integration of such functionality. In one aspect, a geo-fence control system 100 may integrate the system using, at least in part, the BCM 60.

The mobile device application 26 may communicate with the BCM 60 to provide a phone-as-a-key (PAAK) system. The mobile device application 26 may use a digital key over a connection via the TCU 66. In particular, if the mobile device 20 is in-range (e.g., nearfield communication) and connected to the vehicle 10, the mobile device application 26 provides a digital key to the BCM 60, and the BCM 60 enables control of door lock/unlock systems and start/stop ignition systems via vehicle user inputs.

The TCU 66 can be configured to provide vehicle connectivity to wireless computing systems onboard and off-board the vehicle 10 and is configurable for wireless communication between the vehicle 10 and other systems, computers, and modules. For example, the TCU 66 includes a Navigation (NAV) system 70 for receiving and processing a GPS signal from a GPS 72, a Bluetooth® Low-Energy Module (BLEM) 74, a Wi-Fi transceiver, an Ultra-Wide Band (UWB) transceiver, and/or other wireless transceivers (not shown in FIG. 1).

The NAV system 70 is configured and/or programmed to determine a position of the vehicle 10. The NAV system 70 includes a Global Positioning System (GPS) receiver configured or programmed to triangulate a position or vehicle location 73 of the vehicle 10 relative to satellites or terrestrial based transmitter towers associated with the GPS 72. The NAV system 70, therefore, is configured or programmed for wireless communication.

The NAV system 70 may be further configured or programmed to develop routes from a current vehicle location 73 to a selected destination, as well as display a map and present driving directions to the selected destination. In some instances, the NAV system 70 may develop the route according to a user preference. Examples of user preferences may include maximizing fuel efficiency, reducing travel time, travelling the shortest distance, or the like.

NAV system 70 is configured to measure and collect tracking data including determine vehicle location 73, heading, speed, acceleration, braking, and the like.

In addition, the TCU 66 generally includes wireless transmission and communication hardware that may be disposed in communication with one or more transceivers associated with telecommunications towers and other wireless telecommunications infrastructure. For example, the BLEM 74 is configured and/or programmed to receive messages from, and transmit messages to, one or more cellular towers associated with a telecommunication provider, and/or and a Telematics Service Delivery Network (SDN) associated with the vehicle 10 for coordinating vehicle fleet (not shown in FIG. 1).

The BLEM 74 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 74 may include Generic Attribute Profile (GATT) device connectivity for client devices that respond to or initiate GATT commands and requests, and connect directly with a mobile device 20.

The mobile device 20 and a server 40 can connect to the vehicle 10 according to systems and methods described above. The mobile device 20 and the server 40 also connect to one another through various communication channels.

The mobile device 20 may connect with the vehicle 10 using wired and/or wireless communication protocols and transceivers. The mobile device 20 may be communicatively coupled with the vehicle 10 via one or more network(s) 92, which may communicate via one or more wireless channel(s) 90, and/or may connect with the vehicle 10 directly (e.g., channel 94) using near field communication (NFC) protocols, Bluetooth® protocols, Wi-Fi, Ultra-Wide Band (UWB), and other possible data connection and sharing techniques. The vehicle 10 also receives and/or is in communication with the Global Positioning System (GPS) 72.

In some aspects, the mobile device 20 may communicate with the vehicle 10 through the one or more wireless channel(s) 90, which may be encrypted and established between the mobile device 20 and the Telematics Control Unit (TCU) 66. The mobile device 20 may communicate with the TCU 66 using a wireless transmitter associated with the TCU 66 on the vehicle 10. The transmitter may communicate with the mobile device 20 using a wireless communication network such as, for example, the one or more network(s) 92.

The mobile device 20 and the server 40 may be in direct communication via the wireless channel(s) 90 connected by the one or more network(s) 92, and also in indirect communication (e.g., channel 94) via the vehicle 10.

The network(s) 92 illustrate an example of an example communication infrastructure in which the connected devices discussed in various embodiments of this disclosure may communicate. The network(s) 92 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

FIG. 1 illustrates an example functional schematic of a geo-fence control system 100 including some elements described above. The geo-fence control system 100 can include the mobile device 20 including the mobile device application 26, the server 40 including the server application 46 and the geo-fence account list 48, and the vehicle 10 including the vehicle application 36 and the list of devices 38. The geo-fence control system 100 also includes vehicle sensors and systems for determining connection of a mobile device 20 to the vehicle 10 and the vehicle location 73.

Figure 2:
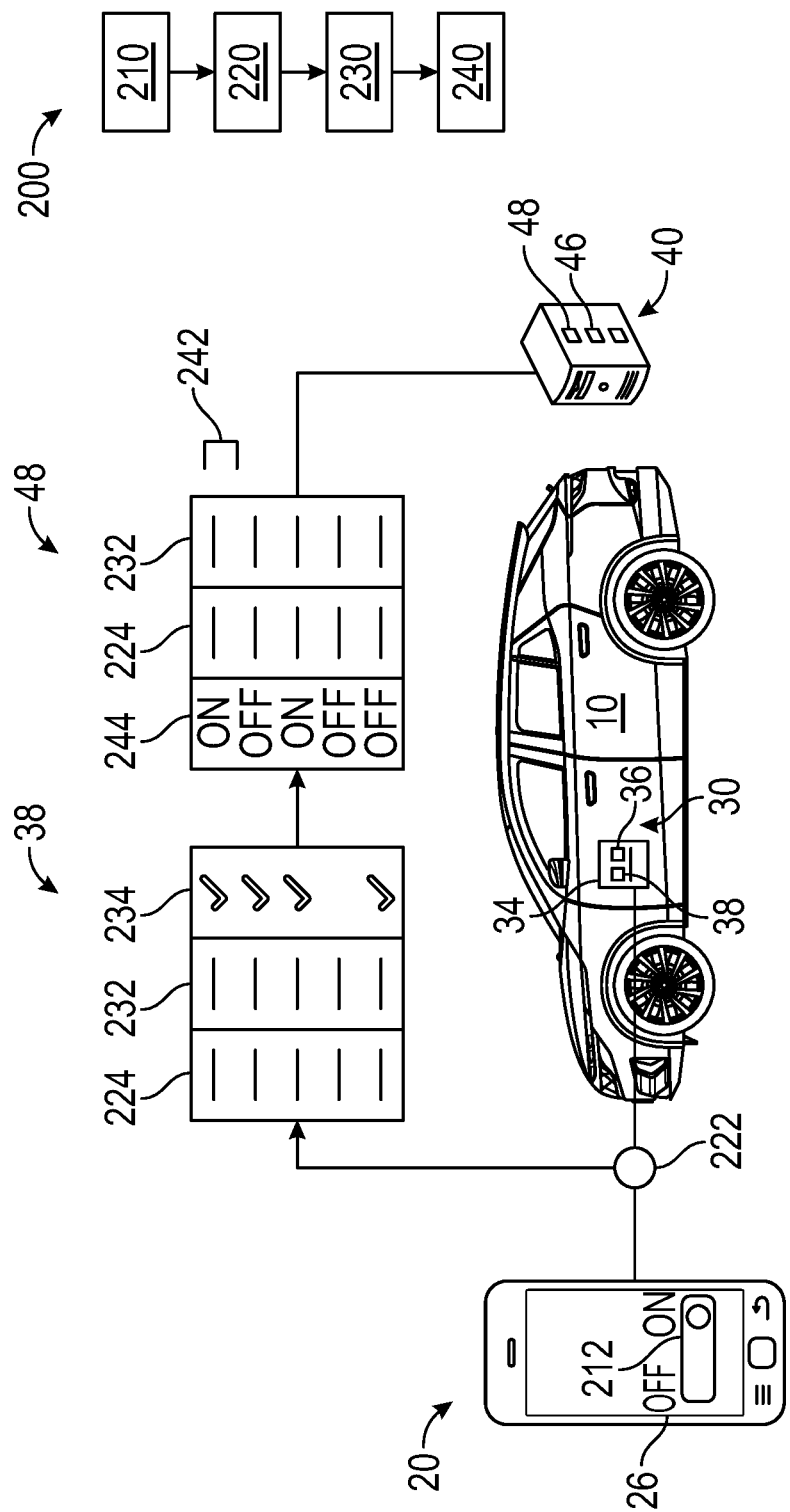
FIG. 2 is a flow chart and schematic illustration of an example method of creating a geo-fence account.

Referring to FIG. 2, the vehicle application 36 generates the list of devices 38 and stores the list of devices 38 in the memory 34. The list of devices 38 is a list of devices (e.g., including mobile device 20) that have paired 222 to or established a connection with the vehicle 10. For example, the mobile device 20 may be paired 222 with the vehicle 10 through the BLEM 74 or through the BCM 60 (e.g., using a PAAK system). The vehicle application 36 monitors devices that pair 222 with the vehicle 10 and adds a mobile device identifier 224 to the list of devices 38 for mobile devices 20 that pair 222 with the vehicle 10.

Figure 3:
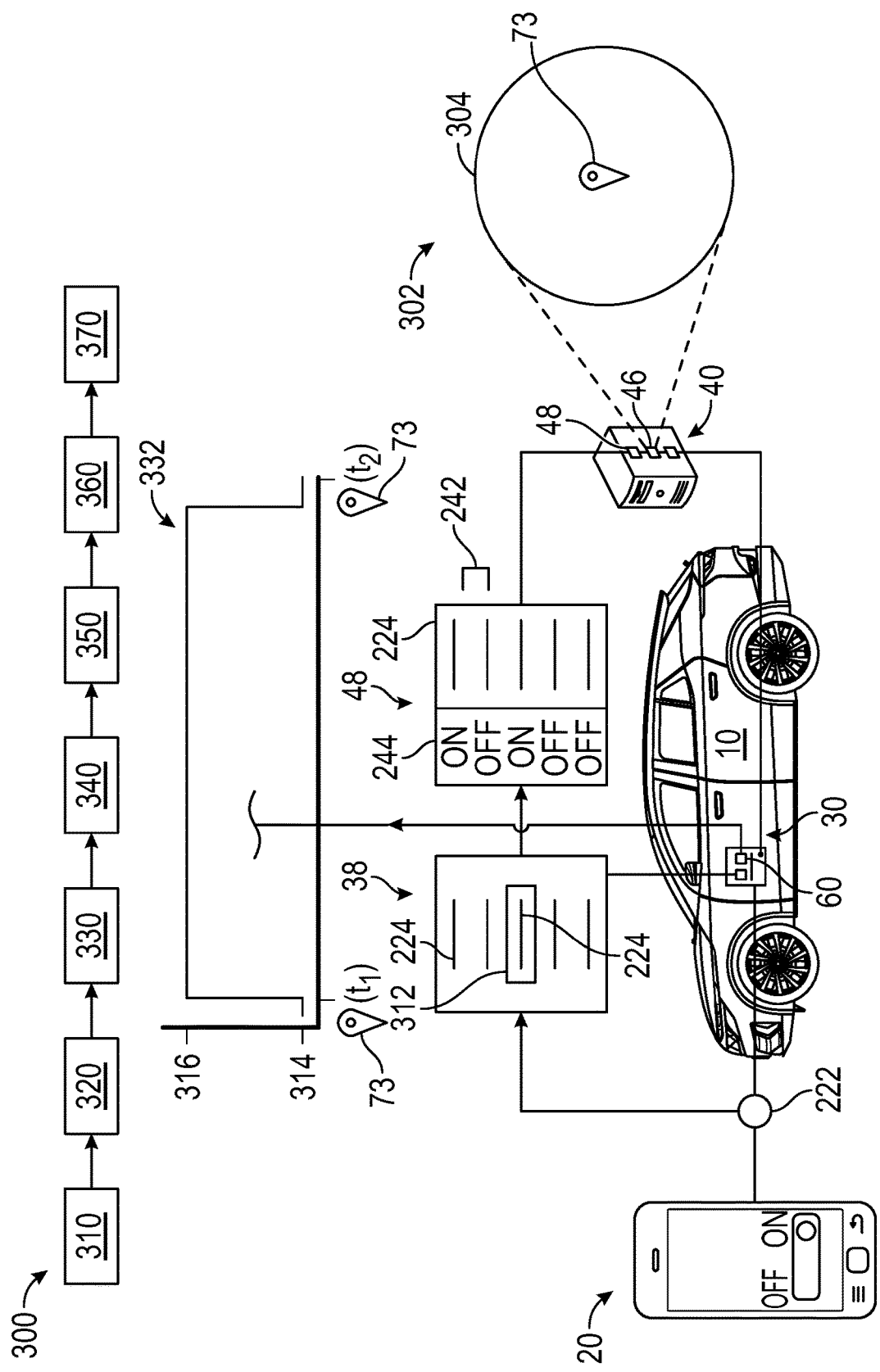
FIG. 3 is a flow chart and a schematic illustration of an example method of providing a geo-fence.

The vehicle application 36 further marks 312 which of the mobile device identifiers 224 in the list of devices 38 was the last to connect to the vehicle 10. In FIG. 3, a last connected mobile device identifier 224 is marked 312 in the list of devices 38. For example, the vehicle application 36 marks 312 the mobile device identifier 224 of the last connected mobile device upon disconnection of the mobile device 20 from the vehicle 10.

Referring to FIG. 2, a setup method 200 for a geo-fence account 242 is now described in further detail. The geo-fence account 242 is added the geo-fence account list 48. According to a first step 210, the mobile device application 26 receives a selection of a dynamic geo-fence setting 212, for example, via an interface of the mobile device 20.

According to a second step 220, the mobile device application 26 and/or the vehicle application 36 determines if the mobile device 20 has been paired 222 to the vehicle 10. For example, the mobile device 20 may be paired 222 with the vehicle 10 as described above using a Bluetooth Low Energy (BLE) vehicle interface or a phone-as-a-key (PAAK) vehicle interface. If the mobile device 20 has been paired 222 to the vehicle 10, a corresponding mobile device identifier 224 (e.g., a name or number associated with the mobile device 20) shows up in the list of devices 38. Accordingly, step 220 can include a request from the mobile device 20 to the vehicle 10 to confirm that the mobile device identifier 224 of the mobile device 20 is in the list of devices 38.

According to a third step 230, if the mobile device 20 has been paired 222 to the vehicle 10 (i.e., the mobile device identifier 224 is found in the list of devices 38), the mobile device application 26 determines if the vehicle 10 received account information 232 from the mobile device 20 and that the account is verified 234 (e.g., through a notification to the mobile device 20 via the mobile device application 26, an email, a text, using the account information 232). For example, the account information 232 includes contact information for notifications such as a phone number or email address.

According to a fourth step 240, if the vehicle 10 received account information 232 and the account is verified 234, the vehicle 10 provides the mobile device identifier 224 of the mobile device 20 and the account information 232 to the server 40. The server 40 adds a geo-fence account 242 to the geo-fence account list 48. The geo-fence account 242 includes the mobile device identifier 224 of the mobile device 20, the account information 232, and a geo-fence setting 244 (e.g., on or off). The geo-fence setting 244 is controlled by and reflects the dynamic geo-fence setting 212 in the mobile device application 26 of the mobile device 20. A change in the dynamic geo-fence setting 212 via the mobile device application 26 causes the mobile device 20 to communicate the change to the server 40 and the server 40 updates the geo-fence account list 48 based on the communicated change.

If the mobile device 20 was not paired, if account information was not received, or if the account is not verified, the method 200 returns to the second step 220 to again pair 222 the mobile device 20 and the vehicle 10.

The server application 46 is now described in further detail. Referring to FIG. 3, the server application 46 is configured to set a geo-fence 302 based on a vehicle location 73 and the geo-fence setting 244, and to deactivate the geo-fence 302 and/or notify users based on information received from the vehicle 10 as described in further detail in the methods below.

The geo-fence 302 includes a geo-fence perimeter 304 (e.g., a virtual perimeter) around the vehicle location 73. The geo-fence perimeter 304 may be defined by a radius and/or with respect to features of a real-world geographic area on a map.

The server application 46 monitors the vehicle location 73 with respect to the geo-fence perimeter 304. If the vehicle location 73 crosses the geo-fence perimeter 304 to leave an area defined by the geo-fence perimeter 304, a response by the server application 46 is triggered as described in further detail below.

Referring to FIG. 3, a method 300 of setting a geo-fence 302 is described. According to a first step 310, at a time t1, the vehicle 10 transitions from an "off" state 314 to an "on" state 316. The state 314, 316 of the vehicle 10 may be monitored, for example, by the BCM 60.

According to a second step 320, the mobile device 20 is paired 222 to the vehicle 10. As the mobile device 10 has previously been paired 222 to the vehicle 10 (e.g., at least during setup of the geo-fence account 242), the mobile device identifier 224 of the mobile device 20 shows up in the list of devices 38.

According to a third step 330, at a time t2, the vehicle 10 determines an indicator 332 of an end of use of the vehicle 10. For example, the indicator 332 can include a transition from the "on" state 316 to the "off" state 314, use of a PAAK (the mobile device 20) to initiate such a transition, ignition set to the "off" state 314, opening of a door with the ignition set to the "off" state 314, unpairing or disconnecting the mobile device 20 from the vehicle 10, combinations thereof, and the like.

According to a fourth step 340, upon determining the indicator 332, the mobile device identifier 224 of the mobile device 20 is marked 312 as the last connected mobile device in the list of devices 38.

According to a fifth step 350, upon determining the indicator 332, the vehicle 10 sends the mobile device identifier 224 of the mobile device 20 that is marked 312 as the last connected mobile device to the server 40. The server 40 determines if the geo-fence account 242 for the mobile device identifier 224 in the account list 48 has the geo-fence setting 244 set to "on."

According to a sixth step 360, if the geo-fence setting 244 is set to "on," the server 40 requests or receives a vehicle location 73 from the vehicle 10 (e.g., from the NAV system 70) and collects or requests additional information. For example, the additional information may include statistics for the vehicle location 73 (e.g., crime statistics) or account information 232 in the geo-fence account 242 such as a maximum walking distance set by a user of the mobile device 20.

According to a seventh step 370, the server 40 determines a geo-fence perimeter 304 around the vehicle location 73. The geo-fence perimeter 304 or area of the geo-fence 302 may be defined by additional information describe above. For example, if the crime statistics are above-average at the vehicle location 73, the geo-fence perimeter 304 is smaller (e.g., a smaller radius) such that notifications will be sent sooner if the vehicle location 73 moves outside the geo-fence perimeter 304.

As another example, the geo-fence perimeter 304 may be defined by the maximum distance a user of the mobile device 20 is willing to walk, which may be stored in the geo-fence account 242 associated with the mobile device 20. Here, a first notification may be sent from the server 40 to the mobile device 20 (i.e., with the mobile device identifier 224 that is marked 312 as the last connected mobile device) if the vehicle 10 has been moved or possessed by another user (e.g., another mobile device) but the vehicle 10 has not crossed the geo-fence perimeter 304. The user of the last connected mobile device 312 may be willing to walk to the new vehicle location 73 within the geo-fence perimeter 304 to retake possession. A second notification may be sent if the vehicle 10 has crossed the geo-fence perimeter 304 so that the user knows the vehicle 10 is not within walking distance and to find another form of transportation if necessary.

Figure 4:
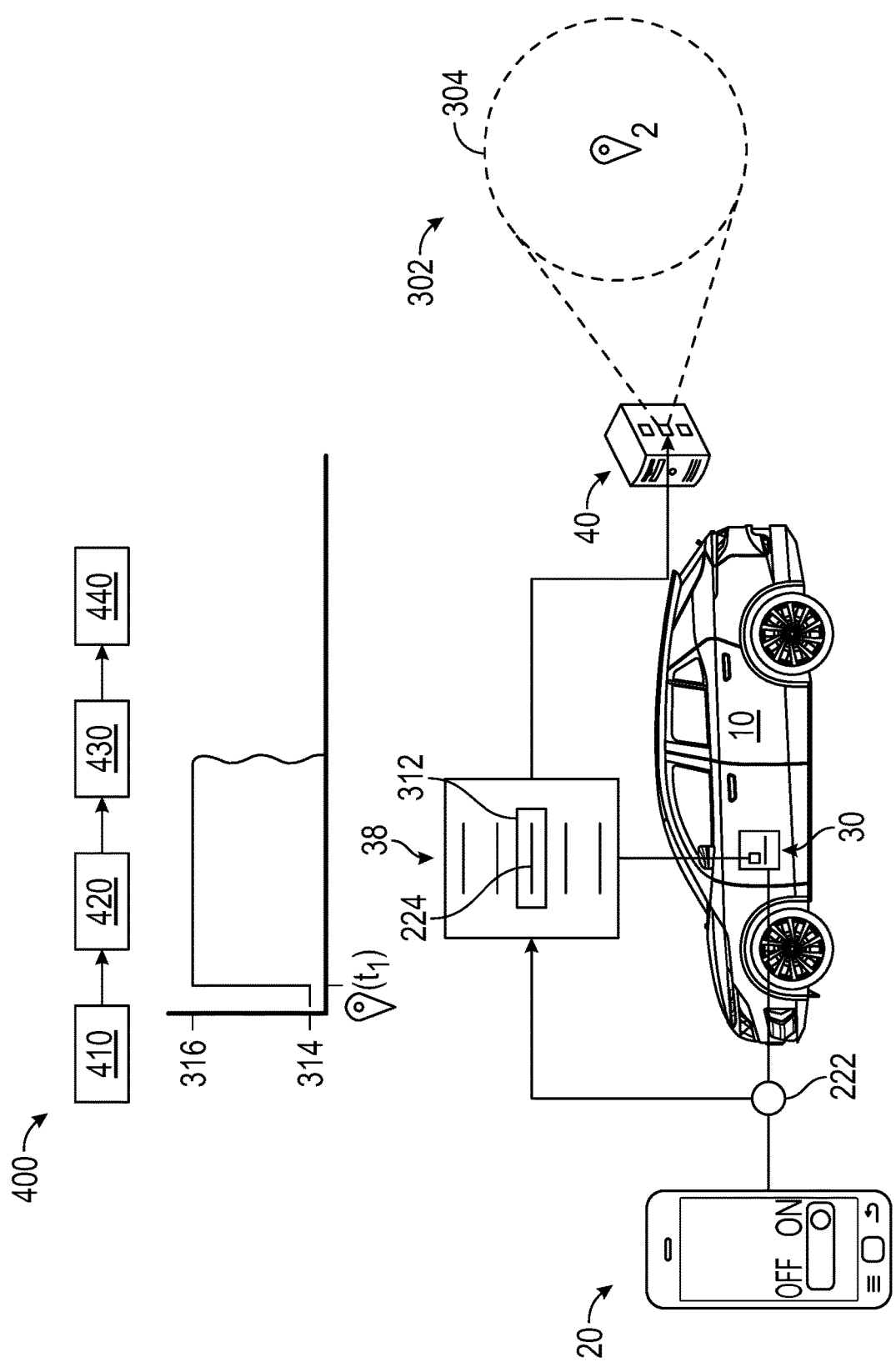
FIG. 4 is a flow chart and a schematic illustration of an example method of disabling a geo-fence.

Referring to FIG. 4, a method 400 of deactivating the geo-fence 302 is described. Here, the user with the mobile device 20 (i.e., with the mobile device identifier 224 that is marked 312 as the last connected mobile device) returns to the vehicle 10. According to a first step 410, the vehicle 10 transitions from an "off" state 314 to an "on" state 316. According to a second step 420, the mobile device 20 is paired 222 to the vehicle 10. According to a third step 430, the vehicle 10 compares the mobile device identifier 224 of the paired 222 mobile device 20 to mobile device identifier 224 that is marked 312 as the last connected mobile device in the list of devices 38. According to a fourth step 440, if the mobile device identifier 224 of the paired 222 mobile device 20 matches the mobile device identifier 224 that is marked 312 as the last connected mobile device in the list of devices 38, the vehicle application 36 signals the server 40 and the server 40 deactivates the geo-fence 302 via the server application 46.

Figure 5:
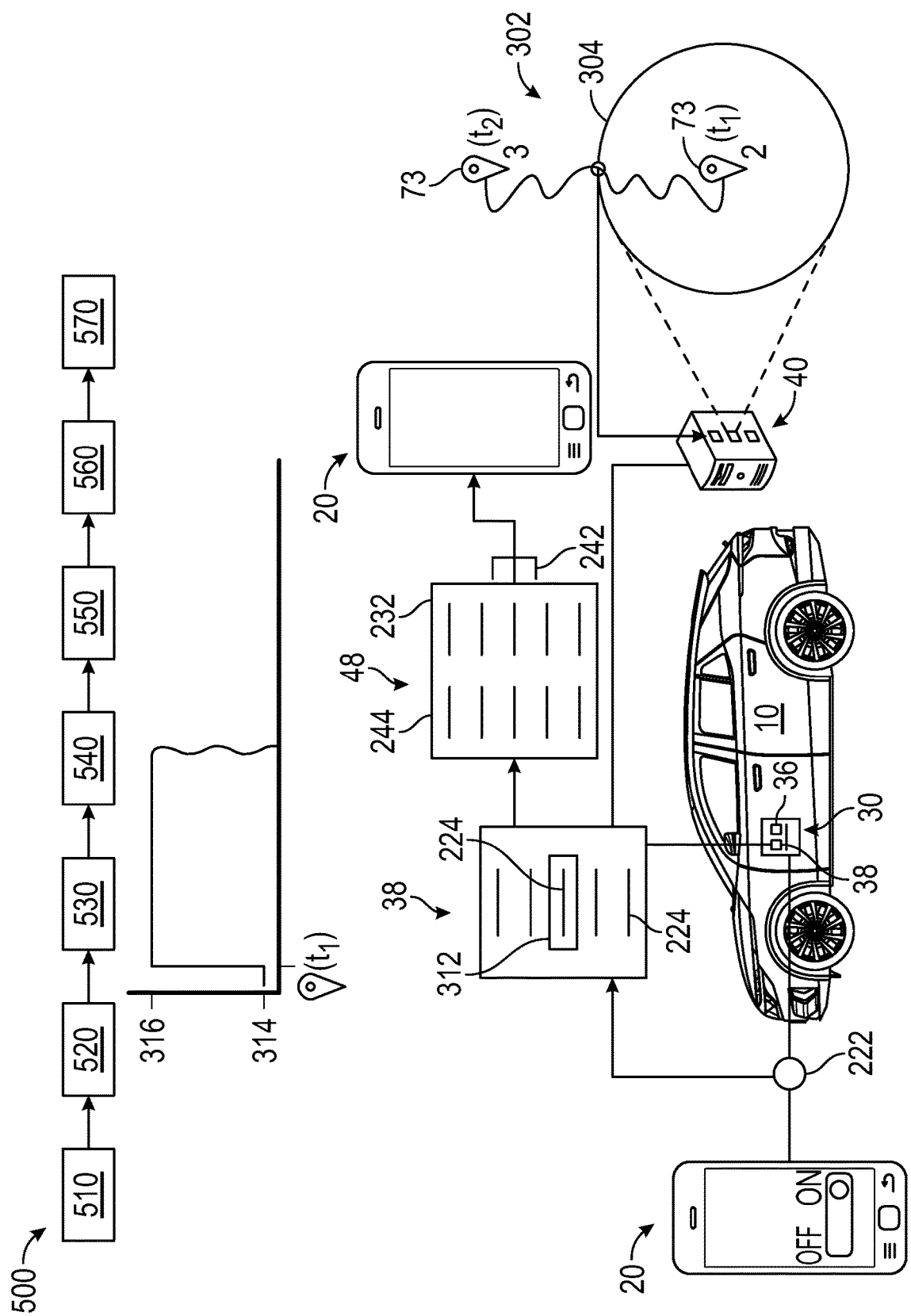
FIG. 5 is a flow chart and a schematic illustration of an example method of providing notifications to a mobile device associated with a geo-fence account.

Referring to FIG. 5, a method 500 of receiving notifications by the mobile device 20 (i.e., with the mobile device identifier 224 that is marked 312 as the last connected mobile device) is described. Here, a user with a mobile device 20 that is not marked 312 as the last connected mobile device takes possession of the vehicle 10.

According to a first step 510, the vehicle 10 transitions from an "off" state 314 to an "on" state 316. According to a second step 520, the mobile device 20 is paired 222 to the vehicle 10.

According to a third step 530, the mobile device identifier 224 of the mobile device 20 is compared to the mobile device identifier 224 that is marked 312 as the last connected mobile device in the list of devices 38. According to a fourth step 540, if the mobile device identifier 224 of the mobile device 20 does not match the mobile device identifier 224 that is marked 312 as the last connected mobile device in the list of devices 38, the mobile device identifier 224 of the mobile device 20 is compared to the other mobile device identifiers 224 in the list of devices 38.

According to a fifth step 550, if the mobile device identifier 224 matches one of the other mobile device identifiers 224 in the list of devices 38, the vehicle application 36 provides the server 40 with the mobile device identifier 224 that is marked 312 as the last connected mobile device and an indication that the vehicle 10 is paired 222 to a mobile device 20 in the list of devices 38 other than the last connected mobile device.

According to a sixth step 560, in response, the server 40 provides a first notification to the mobile device 20 with the mobile device identifier 224 that is marked 312 as the last connected mobile device. The first notification indicates that the vehicle 10 is in possession by a user associated with a mobile device identifier 224 in the list of devices 38.

The server 40 uses the account information 232 in the geo-fence account 242 in the geo-fence account list 48 to communicate with the mobile device 20 with the mobile device identifier 224 that is marked 312 as the last connected mobile device. For example, the mobile device 20 is notified via a text message or via the mobile device application 26 on the mobile device 20.

According to a seventh step 570, if the vehicle location 73 is outside the geo-fence perimeter 304, the server 40 provides a second notification to the mobile device 20 with the mobile device identifier 224 that is marked 312 as the last connected mobile device. The second notification indicates that the vehicle 10 is outside the geo-fence perimeter 304.

Figure 6:
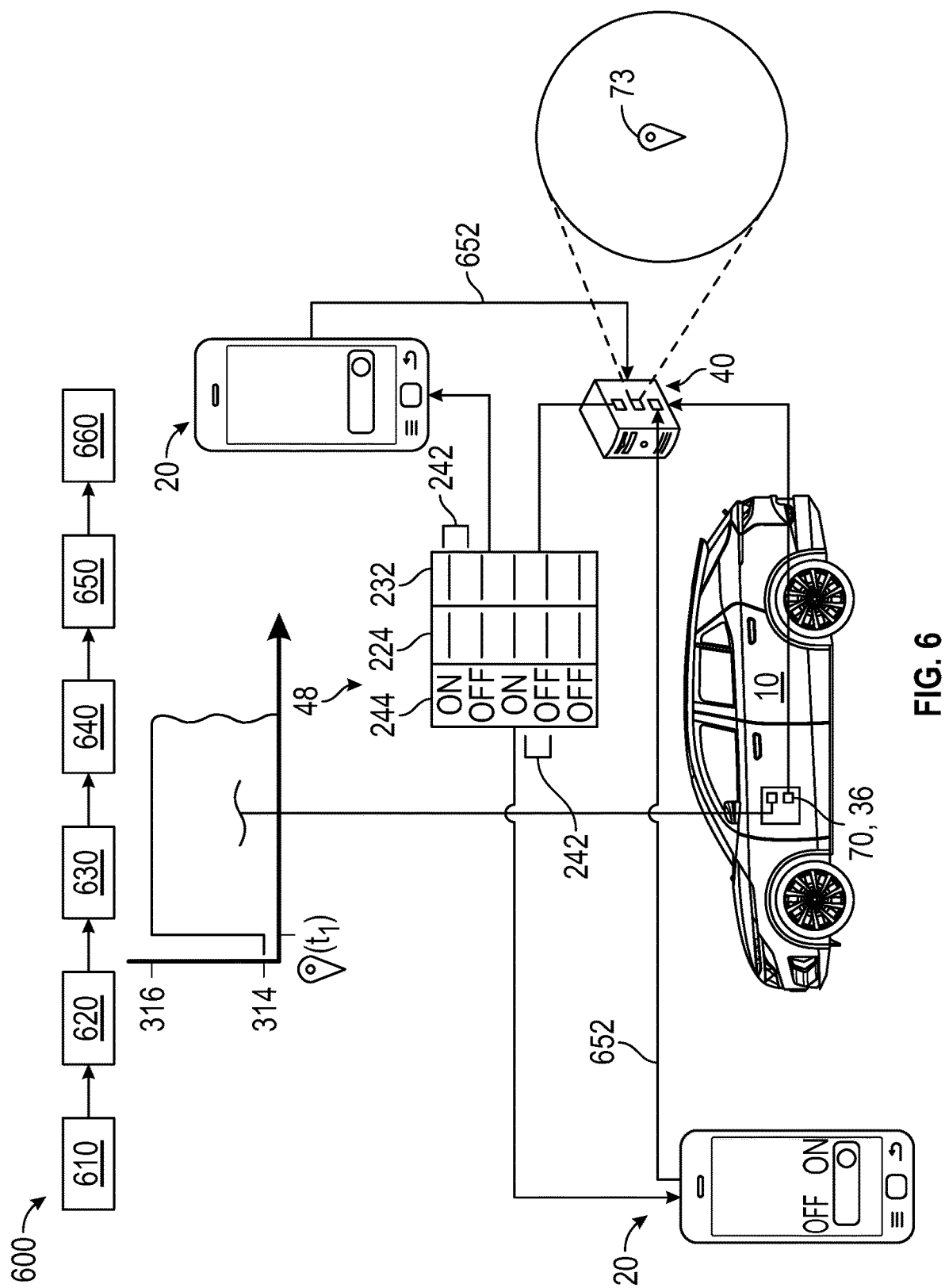
FIG. 6 is a flow chart and a schematic illustration of an example method of confirming possession of a vehicle by a user with a geo-fence account.

Referring to FIG. 6, a method 600 of confirming possession or tracking unconfirmed possession is described. Here, a user takes possession of the vehicle 10 without pairing 222 a mobile device 20 to the vehicle 10.

According to a first step 610, the vehicle 10 transitions from an "off" state 314 to an "on" state 316. According to a second step 620, the vehicle 10 determines that a mobile device 20 is not paired to the vehicle 10. For example, a user starts the ignition with a physical key and has a mobile device 20 that fails to pair to the vehicle 10.

According to a third step 630, the vehicle 10 (e.g., the vehicle application 36) notifies the server 40 that the vehicle is in the "on" state 316 and a mobile device is not paired to the vehicle 10.

According to a fourth step 640, in response to the notification from the vehicle 10, the server 40 notifies mobile devices 20 with associated with geo-fence accounts 242 (e.g., those with mobile device identifiers 224) in the geo-fence account list 48 with the geo-fence setting 244 set to "on."

The server 40 uses the account information 232 in the geo-fence accounts 242 to communicate with the mobile devices 20. For example, the mobile device 20 with the mobile device identifier 224 that is marked 312 as the last connected mobile device is notified via a text message or via the mobile device application 26 on the mobile device 20. The notification to the mobile devices 20 includes a request for confirmation of possession of the vehicle 10.

In addition, the server 40 begins receiving tracking information, for example, from the NAV system 70 of the vehicle 10. The tracking information includes (or can be used to determine) location, heading, speed, acceleration, braking, and the like.

According to a fifth step 650, if the server 40 receives a confirmation 652 from one of the mobile devices 20 to which the notification was sent, the server 40 may cease collection of tracking information and determine whether the response is from a mobile device 20 with a mobile device identifier 224 that is marked 312 as the last connected mobile device. If the one of the mobile devices 20 has the mobile device identifier 224 that is marked 312 as the last connected mobile device, the server 40 may deactivate the geo-fence 302 (e.g., similar to method 400). If the one of the mobile devices 20 has a mobile device identifier 224 that is not marked 312 as the last connected mobile device, the method 600 may proceed according to notification steps 560, 570 of method 500.

According to a sixth step 660, if the server 40 does not receive confirmation from one of the mobile devices 20 to which the notification was sent, and if the geo-fence perimeter 304 is crossed, the server 40 sends a notification to the mobile device 20 with the mobile device identifier that is the last connected mobile device 312.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   storing, by a vehicle, a first mobile device identifier, wherein the first mobile device identifier is based on a connection between a first mobile device and the vehicle, wherein the first mobile device identifier is marked as a last device connected to the vehicle;
   determining a vehicle location of the vehicle;
   accessing a geo-fence account associated with the first mobile device identifier;
   activating, based on a setting of the geo-fence account, a geo-fence based on the vehicle location;
   determining, upon connection of a second mobile device to the vehicle, a second mobile device identifier;
   comparing the first mobile device identifier to the second mobile device identifier; and
   disabling the geo-fence based on the first mobile device identifier being identical to the second mobile device identifier.

2. The method of claim 1, further comprising receiving an indication of an end of use of the vehicle.

3. The method of claim 2, wherein marking the first mobile device identifier as the last device connected to the vehicle is based on the indication of an end of use of the vehicle.

4. The method of claim 2, wherein the vehicle location is based on the indication of an end of use of the vehicle.

5. The method of claim 1, wherein the second mobile device identifier corresponds to an indicator of a beginning of use of the vehicle.

6. The method of claim 1, further comprising generating a list of mobile device identifiers corresponding to mobile devices that have connected to the vehicle.

7. The method of claim 1, further comprising comparing the second mobile device identifier to a list of mobile device identifiers, wherein the list of mobile device identifiers identify mobile devices that have connected to the vehicle.

8. The method of claim 7, further comprising sending a message to the first mobile device based on the second mobile device identifier being identical to one of the list of mobile device identifiers other than the first mobile device identifier.

9. The method of claim 8, further comprising sending a message to the first mobile device based on the vehicle location crossing a virtual perimeter of the geo-fence.

10. The method of claim 7, further comprising collecting vehicle tracking data based on the second mobile device identifier not being identical to any of the list of mobile device identifiers.

11. The method of claim 7, further comprising sending a possession confirmation message to mobile devices associated with an account in a list of geo-fence accounts.

12. The method of claim 11, wherein the possession confirmation message includes a request to confirm whether a user one of the mobile devices is in current possession of the vehicle.

13. The method of claim 11, further comprising deactivating the geo-fence if a response from the first mobile device confirms possession of the vehicle.

14. The method of claim 11, further comprising sending a message to the first mobile device if a response from a mobile device associated with an account in the list of geo-fence accounts, other than the first mobile device, confirms possession of the vehicle.

15. The method of claim 14, further comprising sending a message to the first mobile device if a vehicle location crosses a virtual perimeter of the geo-fence.

16. The method of claim 11, further comprising sending a message to the first mobile device if a response to the possession confirmation message is not received.

17. The method of claim 1, further comprising controlling the setting of the geo-fence account with an application of a mobile device.

18. A geo-fence control system, comprising:
   a vehicle, comprising:
      a processor;
      a memory, comprising:
         a list of mobile device identifiers corresponding to mobile devices that have connected to the vehicle, wherein one of the mobile device identifiers is marked as a last mobile device connected to the vehicle; and
      a vehicle application comprising instructions that, when executed by the processor, causes the vehicle to:
         determine a mobile device identifier of a currently connected mobile device; and a navigation system configured to determine a vehicle location of the vehicle;
a server, comprising:
a processor;
a memory, comprising:
a list of a geo-fence accounts, each geo-fence account including a mobile device identifier and a geo-fence setting, wherein at least one of the geo-fence accounts includes the one of the mobile device identifiers;
a geo-fence application comprising instructions that, when executed by the processor, causes the server to:
activate, based on a geo-fence setting of a geo-fence account, a geo-fence based on the vehicle location; and
disable the geo-fence if the mobile device identifier of the currently connected mobile device is the same as the one of the mobile device identifiers marked as the last mobile device connected to the vehicle.

19. The geo-fence control system of claim 18, wherein the geo-fence application comprises instructions that, when executed by the processor, cause the server to send a notification to the last mobile device connected to the vehicle if the mobile device identifier is the same as one of the list of mobile device identifiers other than the mobile device identifier marked as the last mobile device connected to the vehicle.

20. The geo-fence control system of claim 19, wherein the geo-fence application comprises instructions that, when executed by the processor, cause the server to send a notification to the last mobile device connected to the vehicle if the vehicle location crosses the geo-fence.

\* \* \* \* \*